United States Patent [19]
Mueller

[11] 3,709,046
[45] Jan. 9, 1973

[54] POWER TAKEOFF INTERLOCK
[75] Inventor: Norman W. Mueller, Plainfield, Ill.
[73] Assignee: Milwaukee Boiler Manufacturing Co., Milwaukee, Wis.
[22] Filed: May 24, 1971
[21] Appl. No.: 146,085

[52] U.S. Cl. ............................................. 74/15.86
[51] Int. Cl. ............................................. F16h 37/00
[58] Field of Search ............ 74/15.86, 15.66; 192/4 A

[56] References Cited
UNITED STATES PATENTS
3,040,588   6/1962   Haüsmann et al. .................. 74/15.86

Primary Examiner—Leonard H. Gerin
Attorney—Andrus, Sceales, Starke & Sawall

[57] ABSTRACT

A power takeoff interlock prevents engagement of a transmission driven power takeoff except when the vehicle transmission drive gear is stationary, thereby preventing damage to both the power takeoff and the transmission. A pair of series connected control valves are interposed between the vehicular air tank and the air cylinder which engages and disengages the power takeoff. One of the valves is responsive to the position of the vehicle transmission control lever to deenergize the interlock except when the vehicle transmission is in a power takeoff engaging condition. A second valve is manually operated to energize the air cylinder and engage the power takeoff. A lockup circuit is included so that once engagement of the power takeoff is secured, the transmission lever may be moved to any position without affecting the power takeoff. The interlock also coordinates the operation of the vehicle brake with the operation of the power takeoff.

9 Claims, 3 Drawing Figures

PATENTED JAN 9 1973 3,709,046

INVENTOR.
NORMAN W. MUELLER
BY
Andrus, Sceales, Starke & Sawall
ATTORNEY

POWER TAKEOFF INTERLOCK

BACKGROUND OF THE INVENTION

1. Field of the Invention

The present invention relates to control means for vehicular transmission driven power takeoffs.

2. Description of the Prior Art

A power takeoff is an attachment for connecting a vehicular engine or power train to power driven auxiliary machinery such as hoists, pumps, winches, spreaders, and the like. The power takeoff is selectively couplable to the vehicle power train so as to transmit rotary power from the power train to the auxiliary equipment.

A power takeoff typically consists of a power takeoff gear which slides on a splined shaft off which output power is taken. A shifter shaft controlled by the vehicle operator slides the power takeoff gear in and out of mesh with a drive gear in the power train.

The present invention is particularly directed to power takeoffs usable in connection with power trains comprised of a fluid coupling followed by a planetary gear train. These power trains or transmissions, are commonly termed "automatic," transmissions. Typical of this type of transmission is the transmission manufactured and sold by the Allison Division, General Motors, Inc., Indianapolis, Indiana, as the MT Series automatic transmission. In such transmission, the drive gear for the power takeoff is mounted on a clutch drum of one of the hydraulically actuated disc clutches in the gear train. The power takeoff shifter shaft is operated by a pneumatic system.

To engage the power takeoff, the following operative sequence must be observed. The vehicle brakes are set. The transmission is placed in a drive range, usually in low forward or reverse range. This causes the clutch drum containing the power takeoff drive gear to assume the stationary state. The pneumatic system is energized to operate the shifter shaft and move the power takeoff gear into enmeshment with the transmission drive gear. If the gear teeth butt, preventing meshing of the gears, the power train is allowed to creep slightly until enmeshment occurs.

For operation of the power takeoff with the vehicle stationary, the transmission is returned to the neutral condition and the speed of the vehicle engine increased until the desired power takeoff output shaft speed is obtained. For operation of the power takeoff with the vehicle in motion, the brakes are released and the vehicle driven off.

To disengage the power takeoff, the pneumatic system is operated to pull the power takeoff gear out of enmeshment with the drive gear. This may be accomplished with the transmission either neutral or in one of the driving ranges.

In the past, frequent and severe damage has occurred in the transmission and power takeoff during engagement of the latter. This occurs when the operator, through inadvertence or ineptness, fails to place the transmission in one of the driving ranges. With the transmission out of a drive range, i.e., in neutral the drive gear for the power takeoff is rotating. Meshing of the drive gear and the power takeoff gear is impossible and attempts to engage the power takeoff result in rapid and destructive damage to both the drive gear and the power takeoff gear, making future engagement of the power takeoff impossible without extensive and expensive repair.

SUMMARY OF THE PRESENT INVENTION

It is, therefore, the object of the present invention to provide an interlock means which establishes the coordination between the condition of the vehicle transmission and the power takeoff control necessary to insure proper engagement of the power takeoff without damage to either the transmission or the power takeoff.

The interlock means of the present invention is inexpensive in construction and installation and may be added to previously manufactured vehicles with a minimum of modification and cost.

In order to insure safe, non destructive, engagement of the power takeoff, a means must be provided which prohibits coupling the power takeoff to the transmission except when the power takeoff drive gear in the transmission is stationary, i.e., when the vehicle transmission is in a drive range with the vehicle stationary. The interlock of the present invention accomplishes this through the use of a sensory means responsive to movement of the transmission control lever so that unless the vehicle transmission is placed in a preselected driving range, the power takeoff cannot be engaged. With the transmission in the preselected range, engagement can be effected by operator manipulated control means. Once the power takeoff is engaged, the interlock is so arranged that the transmission lever may be moved to any desired range or to the neutral position without effecting the engagement of the power takeoff. The interlock also operates to set the vehicle brakes at the time of power takeoff engagement to prevent movement of the vehicle except by overt action on the part of the vehicle operator. This prevents accidental damage to the auxiliary machinery driven by the power takeoff.

BRIEF DESCRIPTION OF THE DRAWING

FIG. 1 shows the interlock and the power takeoff in the disengaged condition.

DESCRIPTION OF THE PREFERRED EMBODIMENT

The Power Takeoff

Figure 1:
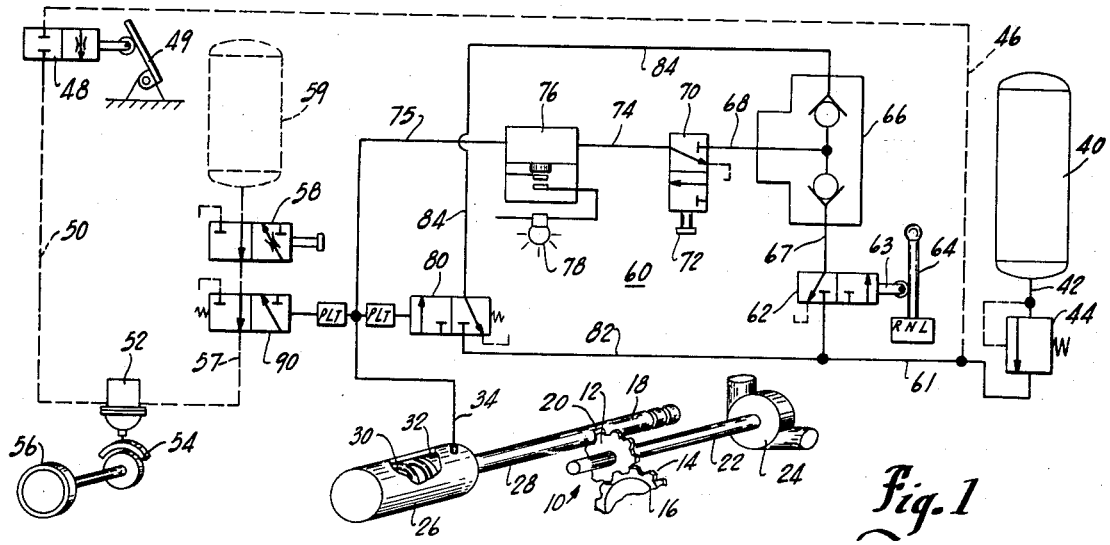
FIG. 1 is a somewhat schematic and diagrammatic view of the power takeoff interlock of the present invention including components and portions of the associated vehicle.
Figure 2:
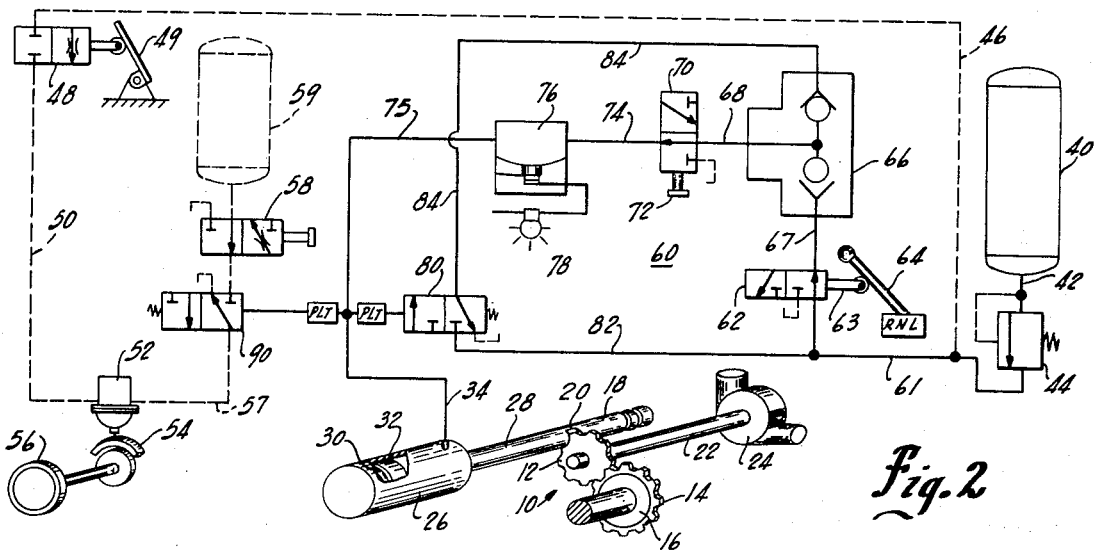
FIG. 2 is a view, similar to FIG. 1, showing the interlock with the power takeoff in the engaged position.

Power takeoff 10 includes power takeoff spur gear 12 suitable for meshing with transmission drive gear 14. Transmission gear 14 is mounted on the outside of clutch drum 16 of the vehicle transmission. For clarity, the remaining portions of the vehicle transmission are not shown.

A shifter shaft 18 contains notch 20 for engagement with power takeoff spur gear 12. Axial movement of shifter shaft 18 moves gear 12 along splined power takeoff output shaft 22 and into and out of enmeshment with transmission drive gear 14 to engage and disengage the power takeoff. Output shaft 22 may be connected to the auxiliary machinery driven by power takeoff 10, for example, pump 24.

Shifter shaft 18 is moved by pneumatic cylinder 26 having piston rod 28 connected to shifter shaft 18. An internal spring 30 bearing on piston 32 urges piston rod 28 into the extended position, causing disengagement of power takeoff 10. Energy in the form of pneumatic pressure, entering pneumatic cylinder 26 by inlet pipe 34, retracts piston rod 28 and moves power takeoff spur gear 12 into enmeshment with transmission drive gear 14 to engage power takeoff 10.

An energy source, such as a tank 40 of compressed air, is provided for operating the brakes, pneumatic cylinder 26 and other air powered elements of the vehicle. Air tank 40 may be charged by an engine driven compressor not shown. Output air line 42 passes through pressure regulating and relief valve 44 which provides regulated air pressure at its outlet.

The outlet of pressure valve 44 is connected via air line 46 to valve 48 operable by brake pedal 49. Valve 48 may be of the normally closed type having a brake pedal responsive throttle action when in the open position. Valve 48 is connected by air line 50 to brake cylinder 52 which operates brakes 54 for retarding the rotation of vehicle wheel 56 and controlling the running speed and condition of the vehicle. In accordance with conventional practice and as a safety measure, brake cylinder 52 includes a spring which applies brakes 54 in the event vehicle air pressure is lost. This spring brake also serves as a parking brake. During normal operation the spring brake is neutralized by air pressure in air line 57. Air line 57 is connected through two normally open valves to air tank 59. When in the operative condition normally operated valve 58 applies the spring brake by venting air line 57 to exhaust.

THE INTERLOCK

Power takeoff interlock 60 of the present invention is connected to the outlet of regulating valve 44 by air line 61. Air line 61 is connected to the inlet of normally closed shifter interference valve 62. Interference valve 62 may be a roller cam operated, spring return, three way valve. Interference valve 62 is so mounted and located on the vehicle transmission that roller cam 63 is struck when transmission lever 64 is placed in one of the drive range positions. In interlock 60 shown in FIG. 1, cam 63 is struck when transmission lever 64 is placed in the reverse range. When cam 63 is struck by transmission lever 64, valve 62 is opened.

Source diversion valve 66 provides air pressure in an outlet air line from either of two inlet air lines. Source diversion valve 66 is schematically shown as two back-to-back check valves. In actuality, source diversion valve 66 may be of the floating shuttle or poppet type. One inlet of source diversion valve 66 is connected to interference valve 62 by air lines 67. The other inlet of source diversion valve 66 is connected to lock up air line 84 in a manner hereinafter described. The outlet air line 68 of source diversion valve 66 is connected to normally closed power takeoff engagement valve 70. Engagement valve 70 may comprise a manually operated three way valve.

Valve 70 is manually operable by lever 72 to engage or disengage power takeoff 10 in a manner hereinafter described. Lever 72 may be located on the vehicle operator's control panel or dashboard. The outlet of power takeoff engagement valve 70 is connected by air line 74, to pressure switch 76 which operates indicator light 78, also mounted on the dashboard. Pressure switch 76 is shown diagrammatically as a diaphragm switch. The outlet of pressure switch is connected to pneumatic cylinder 26 by air line 75.

Pressure regulating and relief valve 44 is also connected to normally closed source transfer valve 80 by air lines 61 and 82. Source transfer valve 80 may be a pilot operated, spring return, three way valve, operable by the pneumatic pressure in air line 75. The outlet of source transfer valve 80 is connected to the other inlet of source diversion valve 66 by lockup air line 84.

Air line 75 is connected to automatic dump valve 90. Dump valve 90 may also be a pilot operated, spring return, three way valve. Automatic dump valve 90 is normally open to supply air pressure from air tank 59 to brake cylinder 52 to release the spring brake.

It will be seen that, in essence, power takeoff interlock 60 consists of two valves 62 and 70 connected in series between air tank 40 and pneumatic cylinder 26 to control the application of energy from the former to the latter. In addition, source transfer valve 80 and source diversion valve 66 provide a means, connected to the output of valves 62 and 70, for connecting air tank 40 intermediate the two series connected valves.

OPERATION

Air tanks 40 and 59 are charged by the engine driven compressor. Pressure regulating and relief valve 44 provides air having a regulated pressure at its outlet. In the normal operation of the vehicle, i.e., without power takeoff 10 being engaged, the air pressure in air line 46 from valve 44 is used to operate air brakes 54 by manipulation of foot pedal 49. Shifter interference valve 62 is generally closed but may be opened from time to time as transmission lever 64 is operated. However, with power takeoff engagement valve 70 in the closed state, the remaining portions of power takeoff interlock 60 are rendered inoperative, and power takeoff 10 is not engaged. This condition of power takeoff interlock 60 is shown in FIG. 1. The closure of series connected valves 62 and 70 insures that power takeoff 10 will not be accidentally engaged while transmission drive gear is rotating, thereby preventing damage to both elements.

To engage power takeoff 10, the operator brings the vehicle to a stop. The parking brake controlled by valve 58 need not be set. The operator then shifts the vehicle transmission into reverse range by grasping and moving transmission lever 64. This causes transmission drive gear 14 to assume the stationary state. Moving transmission lever 64 into the reverse range position causes the lever to strike cam 63 of valve 62, opening the valve and supplying air pressure through source diversion valve 66 and outlet air line 68. As power takeoff engagement valve 70 is closed, the remaining portions of power takeoff interlock 60 are still deenergized.

With power takeoff drive gear 14 in the stationary state, lever 72 of power takeoff engagement valve 70 may now be operated to open valve 70 and provide air pressure in air line 74 to pneumatic cylinder inlet 74. This air pressure acting on piston 34 causes retraction of piston rod 28 and shifter shaft 18, moving power takeoff gear 12 along splined output shaft 22 into enmeshment with driving gear 14 to engage power takeoff 10. In the situation in which the gear teeth initially butt, the slack may be taken out of the power train, allowing an incremental rotation of power takeoff drive gear 14 and facilitating enmeshment of the gears. The air pressure in air line 74 operates pressure switch 76 to light indicator light 78, indicating that power takeoff 10 is engaged. As power takeoff 10 is engaged, the air pressure in air line 75 operates dump valve 90 to reduce the pressure in air line 57 and set brakes 54. This prevents inadvertent further movement of the vehicle and possible damage by over speeding to the auxiliary machinery if the vehicle was accidently driven off with the power takeoff engaged.

Figure 3:
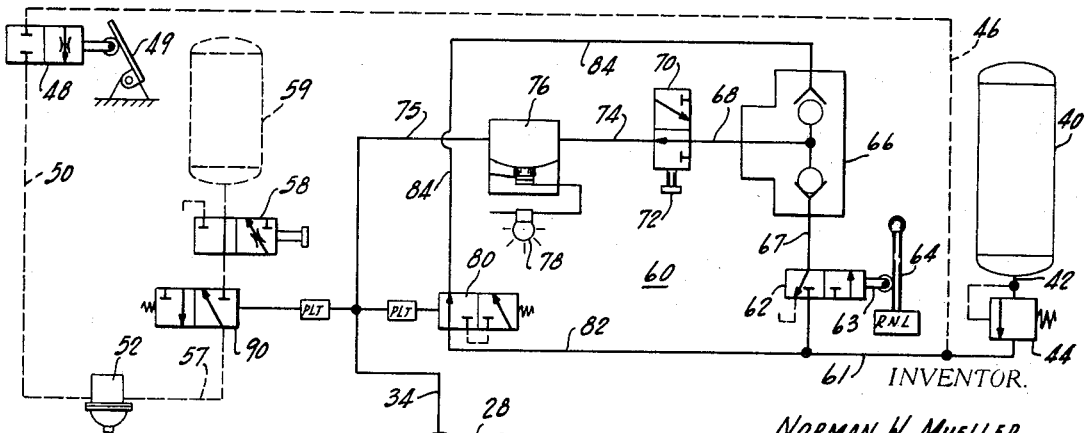
FIG. 3 is a view similar to FIG. 2, showing further operation of the engaged power takeoff with the vehicle transmission in neutral.

The vehicle transmission may now be placed in neutral, as shown in FIG. 3, for operation of the auxiliary machinery 24 through power takeoff 10. The air pressure in air line 75 operates source transfer valve 80 to provide air pressure in air line 84 to the other inlet of source diversion valve 66. This maintains pressure in air lines 68, 74 and 75 even though control valve 60 is reclosed by moving the transmission lever to neutral, or drive ranges other than reverse.

In cases in which the vehicle is driven while a power takeoff is engaged, brake 54 may be released. In the alternative, the interconnection provided by dump valve 90 of interlock 60 may be eliminated.

At the completion of the operation of the auxiliary machinery, such as pump 24, lever 72 is operated to close valve 70 and remove the air pressure in air line 74. Loss of pressure in air line 74 causes spring 30 to extend piston rod 28, moving power takeoff spur gear out of enmeshment with drive gear 14, disengaging power takeoff 10. Source transfer valve 80 is placed in the closed position, removing the air pressure in air line 84 to source diversion valve 66. The above described operative cycle may then be repeated.

It will be appreciated that modification and alterations may be made to the power takeoff interlock described above. For example, while a pneumatic operated power takeoff has been shown and described above, the invention is equally applicable to hydraulically or electrically operated power takeoffs. In the latter case electrical apparatus such as switches and rectifiers may be substituted for the pneumatic valves shown and described herein.

Further, while shifter interference valve 60 is shown as operable be transmission control lever, the valve may be made responsive to other elements of the transmission which are capable of indicating the rotary condition of the transmission gear used to drive the power takeoff.

Various modes of carrying out the invention are contemplated as being within the scope of the following claims particularly pointing out and distinctly claiming the subject matter which is regarded as the invention.

I claim:

1. An interlock for a vehicular power takeoff drivingly engageable with a selectively rotatable transmission drive gear, the rotary condition of the transmission drive gear being determined by the state of the vehicle transmission, the power takeoff having means for engaging the power takeoff with the transmission drive gear when energized from an energy source, said interlock permitting such engagement only when the transmission drive gear is in a preselected rotary condition and comprising:

energy control means having an input connected to said power takeoff engaging means, said energy control means including first and second series connected valves for providing energization from the energy source to the engaging means when said first and second valves are in an operative state, said first valve being responsive to the condition of the vehicle transmission for assuming the operative state when the transmission gear is in said preselected condition, said second valve having manipulatable means for placing the valve in the operative state.

2. The interlock of claim 1 wherein said first and second valves are normally in an inoperative state.

3. The interlock of claim 1 wherein said vehicle transmission has an operator controlled means for determining the state thereof and wherein said first valve is operatively engageable by said means.

4. The interlock of claim 1 wherein said power takeoff engaging means is pneumatically operable and said energy control means is a pneumatic control means.

5. The interlock of claim 1 including a third valve means having an energy transmitting circuit with an inlet connected to the energy source and an outlet connected between said first and second valves, said third valve means having a control circuit connected to the output of said energy control means and responsive to the passage of energy through said energy control means for providing energy to said second valve, thereby to render the interlock uneffected by the subsequent state of said first valve.

6. The interlock of claim 5 wherein said third valve means includes a pilot operated valve having a pilot connected to the output of said energy control means, said valve having an inlet connected to said energy source and an outlet connected between said first and second valves.

7. The interlock of claim 6 wherein said third valve means includes check valve means in the output thereof for permitting the supply of energy to said second valve from either said first valve or said pilot operated valve.

8. The interlock of claim 1 wherein the rotary condition of the transmission drive gear is additionally determined by the running condition of the vehicle and the vehicle has running speed control means operable from said energy source, and wherein the output of said energy control means is connected to said running speed control means for operating said control means into the desired running condition when said valves are in the operative state.

9. The interlock of claim 1 wherein said interlock is further defined as permitting engagement of the power takeoff only when the transmission drive gear is stationary, and said first valve assumes the operative state when the transmission gear is stationary.

* * * * *